June 11, 1940.                C. J. BREITENSTEIN ET AL                2,203,889
                                  ROTARY SPINNER SWITCH
                              Filed Aug. 26, 1937          2 Sheets-Sheet 1

Inventors
Charles J. Breitenstein
and Frank G. Nicolaus
By Paul O. Pippel
Atty.

June 11, 1940.　　C. J. BREITENSTEIN ET AL　　2,203,889
ROTARY SPINNER SWITCH
Filed Aug. 26, 1937　　2 Sheets-Sheet 2

Inventors
Charles J. Breitenstein
and Frank G. Nicclaus
By Paul O. Pippel

Patented June 11, 1940

2,203,889

UNITED STATES PATENT OFFICE 2,203,889

ROTARY SPINNER SWITCH

Charles J. Breitenstein and Frank G. Nicolaus, Chicago, Ill., assignors to Raymond T. Moloney, Chicago, Ill.

Application August 26, 1937, Serial No. 161,063

6 Claims. (Cl. 200—92)

The invention relates to a rotary wiper switch having use in any desired organization, but particularly amusement apparatus where a wiper switch arm is moved across a row of contact buttons to establish electrical circuits for lighting electrical lamps, or energizing other electrical devices such as relays and the like.

These wiper switches may take the form of a spinner in which the wiper switch arm is given an impulse from a drive mechanism to cause it to turn or spin freely over a circular series of contact buttons until the switch arm loses its momentum and finally comes to rest on a contact button in a chance manner, thus establishing or completing a circuit. In the past these switch wiper arms were operated by a pawl and ratchet drive mechanism which necessitated a hammer-like blow be imparted from the pawl to the ratchet wheel for imparting the requisite spin to the arm. This repeated hammering very rapidly destroyed the spinner unit and also caused early breakdown thereof and required much servicing, repairs and replacement of worn parts.

With these difficulties in mind, it is the primary object of this invention to provide an improved spinner unit for the purposes stated.

Another object of the invention is to provide a spinner unit, which will not break down in use.

Another object is to provide a gear driven spinner switch device.

Another object is to provide a positive lock for the improved switch device.

Still another object is to provide a friction safety drive coupling in the drive parts to prevent damage to any parts when the spinner switch arm is locked.

Another object is to provide such a spinner device as a small compact unit capable of placement in any organization, game, or the like, where such spinner has utility.

Other important objects will become apparent to those skilled in this art as the disclosure is more fully made.

Briefly, these important objects may be achieved in the practicable form of the invention herein selected by way of example for disclosure purposes, said form including a mounting structure carrying a frame. The frame carries an electric motor adapted to be energized for a short interval to drive a set of reduction gearing for turning a cross shaft. Said shaft carries a frictionally driven part turnable in an insulated plate on which is mounted a spaced circular series of contact buttons for a number of individual circuits for respective, individual electric lamps or the like. The frictionally driven part carries and drives a wiper switch arm movable over these contacts. Operatively associated with the drive mechanism is a peripherally notched disk and cooperable with same is an electromagnetic lock device to lock the disk and wiper switch arm against rotation. When the disk is unlocked the wiper arm may be driven and when the disk is locked the friction drive part acts to dissipate the drive torque of the gearing and shaft without turning the wiper switch arm.

Figure 4:
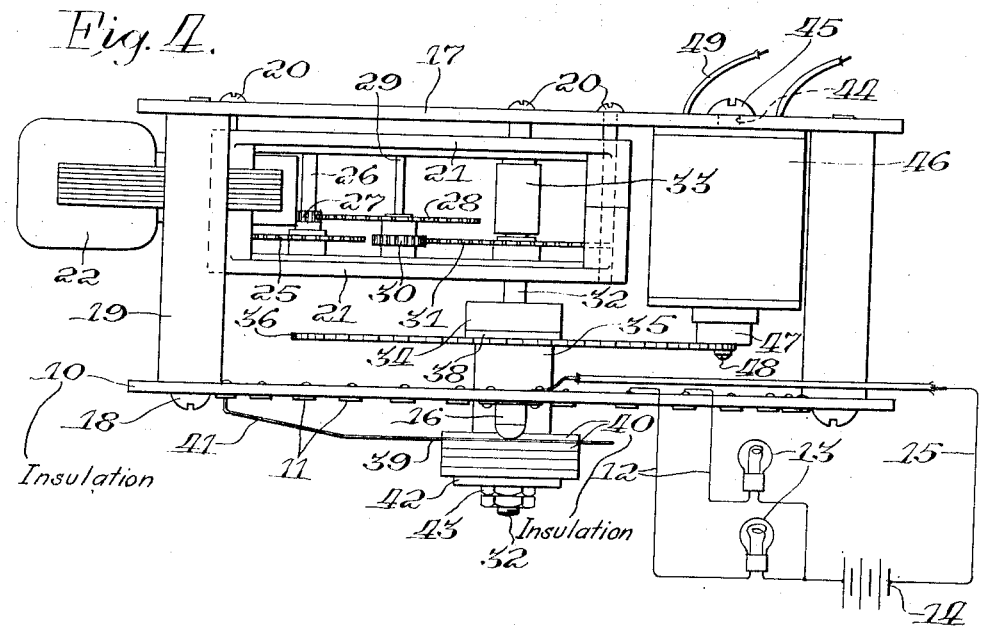
Figure 4 is an enlarged plan view of the assembled unit.

The improved device comprises a front rectangular plate 10 of insulation material, said plate carrying conductor buttons 11 in a spaced circular series, each button being wired in a circuit 12, as shown in Figure 4 with a lamp 13 and a source of electrical energy represented by a battery 14. The other side of each of these circuits 12 is shown at 15, leading from the battery to a stationary conductor clip 16 on the front plate 10 and comprising a spring blade wiper arm as shown.

A rear plate 17 is provided and connects with the front plate by four screws 18 and respective spacers 19. By means of screws 20 the rear plate 17 carries an interior auxiliary frame 21, said frame 21 at one end carrying a small electric motor 22 having a rotor 23 to drive a small spur gear 24 meshed with and driving a larger gear 25 on a shaft 26 in the frame 21. The shaft 26 carries a gear 27 to drive a gear 28 on a parallel shaft 29 said gear 28 having a small hub gear 30 driving a large gear 31 on a parallel shaft 32, a spacer 33 serving to position the gear 31. The shaft 32 turns with the gear 31 and extends forwardly through the plate 10.

Turnable with the shaft 32 is an enlarged sleeve or collar 34. Passed through the front plate 10 is a coaxial sleeve part 35 and turnable with said part is a large disk wheel 36 having peripheral notches 37, said disk 36 being positioned between the front wall 10 and auxiliary frame 21, as shown in Figure 4. A felt or friction drive disk 38 is loosely clamped between the disk 36 and collar 34.

Figure 1:
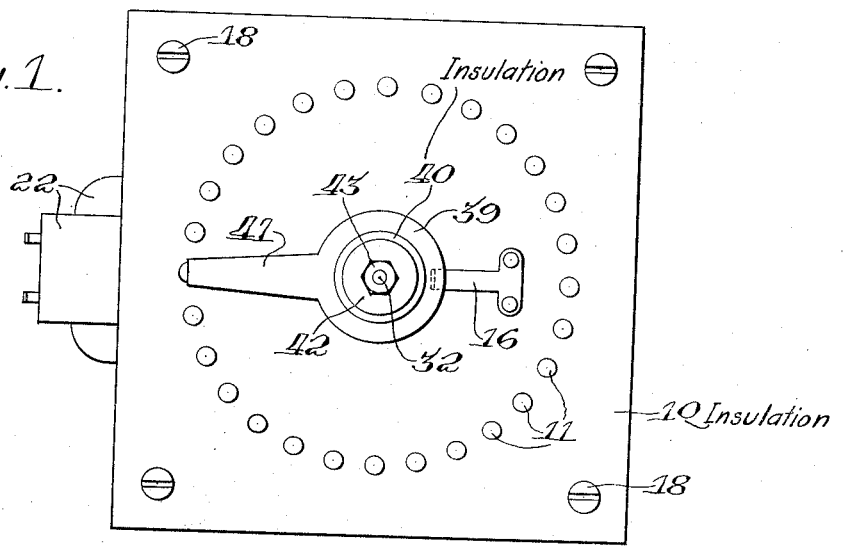
Figure 1 is a front elevational view of the spinner switch unit.
Figure 2:
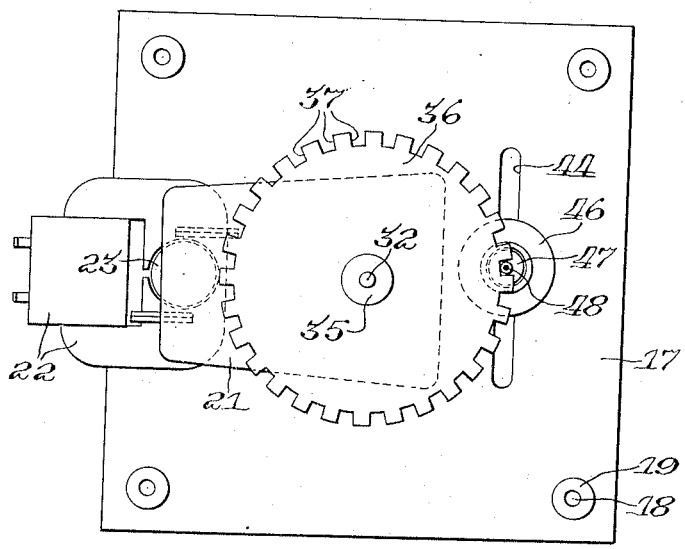
Figure 2 is another front elevational view with the front, or contact carrying plate removed to expose certain interior parts.
Figure 3:
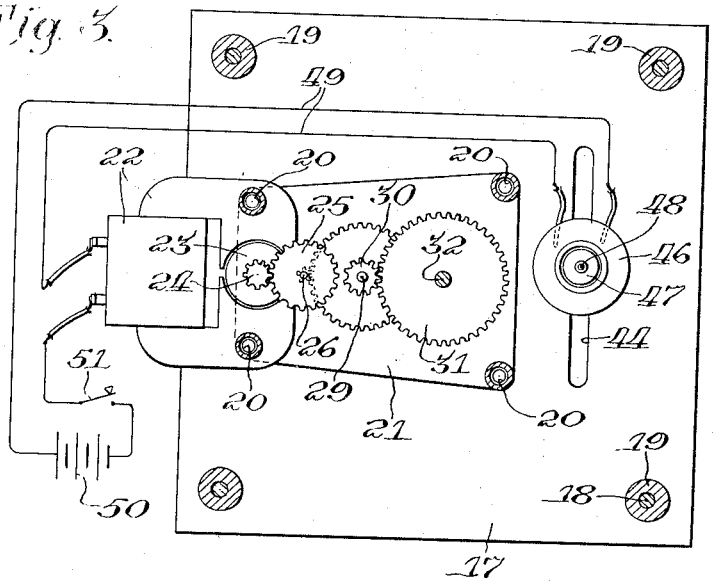
Figure 3 is still another front elevational view with the front plate and peripherally notched lock disk also removed to expose the driving gearing.

The front end of the sleeve 35 has clamped thereon a conductor disk 39 by means of insulation washers 40, said disk 39 including an integral, radial wiper switch arm 41 contacting the contact buttons 11 on the front face of the plate 10, as shown. The stationary wiper blade 16 always engages the back face of the conductor disk 39 as shown in Figures 1 and 4. A washer 42 and nuts 43 hold this assembly together in any appropriate manner.

The back wall plate 17, opposite from the motor 22 is provided with a vertical slot 44 in which is mounted a clamp screw 45 for carrying a solenoid 46 having the usual outwardly spring urged core 47 formed at its free end with a reduced detent portion 48. By means of the screw 45 the solenoid 46 may be vertically positioned in the slot 44 in a manner best making it possible for the detent 48 to be engaged in the notches 37 of the wheel 36 to lock the latter against turning movement. A common circuit 49 by way of illustration, may be provided for both the solenoid 46 and motor 22, with a source of energy 50, a switch 51 being included in the circuit 49 to close the said circuit and cause the motor and solenoid to be energized. Separate circuits for the motor and solenoid may, of course, be provided. This completes the detailed description of the parts.

In use it will be assumed that the wiper switch arm 41 is to be rotated from one contact button 11 to another, in a chance manner to cut off a circuit from one lamp 13 and to establish another circuit to another lamp 13. It will be understood that devices other than lamps may be used in the circuits 12. Normally the motor 22 and relay 46 are deenergized and the wiper switch 41 is at rest on one of the buttons 11. By closing of the switch 51 in any desired manner, manually or automatically, for an instant or longer, the solenoid is operative to retract its core and detent 48 to free the disk 36. At the same time the motor 22 now operates so that its rotor 23 turns the drive gearing 24 to 31 as described to cause rapid rotation of the collar 34. By means of the friction pad disk 38 the wheel 36, collar 35, and wiper arm 41 are now driven. When the motor 22 stops, of course, the drive parts also stop and the parts come to rest, the solenoid now being also deenergized so that the detent 48 is once more effective to lock the disk 36 and arm 41 in position on a button contact 11. By some other circuit arrangement for the lock solenoid 46, than the one shown, the action of deenergizing the solenoid could be delayed so that once inertia to the gearing has been imparted by the motor, the momentum developed could spin the arm 41 for an instant longer. Thus it is obvious that the circuit for the solenoid 46 could be separate from the circuit for the motor 22. In such event if an attempt were made by the motor 22 to drive the arm 41 while the disk 36 were still locked, the friction felt insert 38 would dissipate the drive torque and save the disk 36 and arm 41 from damage.

It will now be appreciated that an improved spinner device has been provided for the purposes intended which device achieves the desirable objects of the invention heretofore stated.

The intention is to cover all changes and modifications of the present example which do not depart from the spirit and scope of the invention as covered in the appended claims.

What is claimed is:

1. In a rotary switch, a contact carrying plate with the contacts disposed in a circle, means journaled in the plate for carrying a switch member movable always in the same direction over the contacts, a motor including gearing to drive the member, a friction drive coupling interposed in the gearing, a peripherally notched wheel turnable with the member, and a detent movable parallel to the axis of the notched wheel to lock the said wheel to prevent turning of the member.

2. In a rotary switch, a contact carrying plate with the contacts disposed in a circle, means journaled in the plate for carrying a switch member movable always in the same direction over the contacts, a motor including gearing to drive the member, a friction drive coupling interposed in the gearing, a peripherally notched wheel turnable with the member, and an electromagnetically controlled device having a member movable perpendicular to the face of the wheel to lock the wheel by engaging a notch thereon to prevent turning of the member.

3. In a rotary switch, a frame including a contact carrying plate with the contacts disposed in a circle, a wiper arm journaled on the frame for movement in always the same direction over the contacts, a motor on the frame including gearing to drive the arm from the motor, a friction coupling between the gearing and arm, a peripherally notched wheel turnable with the arm, electromagnetic means including a part movable perpendicular to the face of the wheel to engage a notch in said wheel to hold the wheel and arm against rotation independently of the gearing, and means for adjustably carrying said electromagnetic means on the frame.

4. A rotary spinner switch comprising a pair of spaced parallel plates secured together, one of said plates being of insulation material, an auxiliary frame secured between said plates, an electric motor and reduction gearing driven therefrom, both the motor and gearing being supported between the plates by the auxiliary frame, a circle of spaced contacts for electric circuits on the outer face of the plate of insulation material, driven means journaled in the plates including a wiper arm movable across the contacts, a friction coupling operatively disposed between the gearing and driven means, a lock wheel turnable with the driven means and disposed between the plates parallel thereto, and a lock means carried by one plate and including a part movable perpendicular to the lock wheel to engage same for locking the lock wheel and wiper arm against turning, the friction means absorbing the drive force of the motor and reduction gearing.

5. In a rotary switch, a mounting structure including a plate of insulation material carrying a circle of contacts, a shaft carried in said structure, a functionally integral unit turnable on the shaft and embodying a wiper arm engageable with the contacts and a wheel notched along its periphery, an irreversible electric motor and reduction gearing constantly driven therefrom when the motor operates and carries on the mounting structure, a friction drive coupling operatively disposed between the gearing and functionally integral unit whereby said gearing is normally operative to drive the functionally integral unit and move the arm over the contacts in always the same direction, and an electromagnetically controlled detent device carried by the mounting structure for engaging and disengaging the notches in the wheel in any angular position thereof to lock and unlock the functionally integral unit against or for turning, the friction coupling serving to permit turning of the motor and gearing while said unit is locked.

6. In a rotary switch, a mounting structure including a plate of insulation material carrying a circle of contacts, a shaft carried in said structure, a functionally integral unit turnable on the shaft and embodying a wiper arm engageable with the contacts and a wheel notched along its periphery, an irreversible electric motor and reduction gearing constantly driven therefrom when the motor operates and carried on the mounting structure, a friction drive coupling operatively disposed between the gearing and functionally integral unit whereby said gearing is normally operative to drive the functionally integral unit and move the arm over the contacts in always the same direction, and an electromagnetically controlled detent device carried by the mounting structure for engaging and disengaging the notches in the wheel in any angular position thereof to lock and unlock the functionally integral unit against or for turning, the friction coupling serving to permit turning of the motor and gearing while said unit is locked, the said unit comprising a sleeve passing through the plate with the wiper arm on one side of the latter and the notched wheel on the other side of the plate.

CHARLES J. BREITENSTEIN.
FRANK G. NICOLAUS.